(No Model.)  2 Sheets—Sheet 1.
B. F. HUTCHES, Jr.
BALING MACHINE.
No. 533,065.  Patented Jan. 29, 1895.
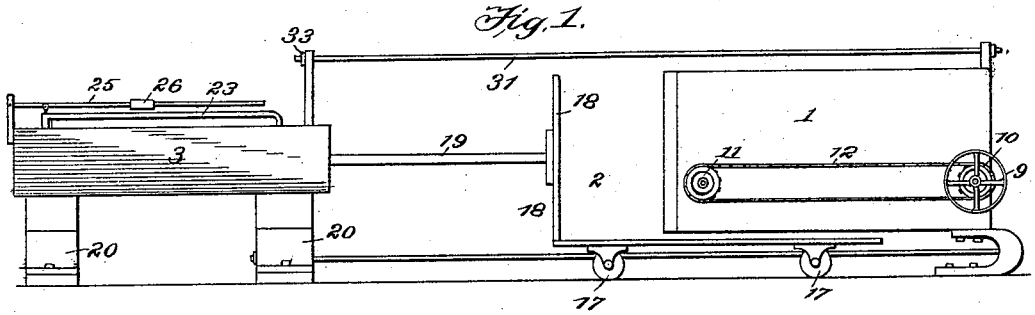
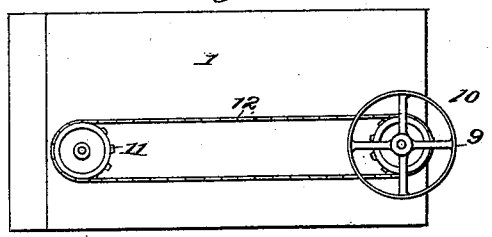
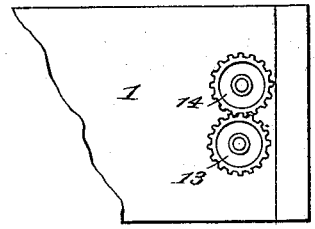
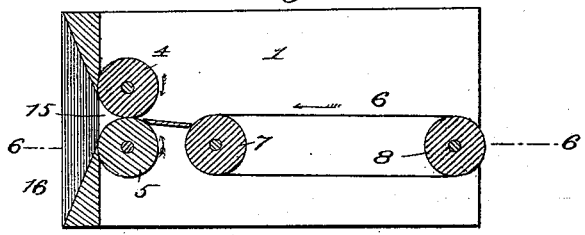
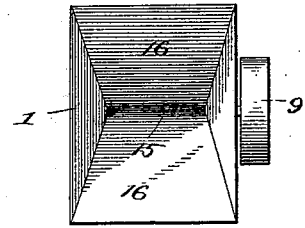
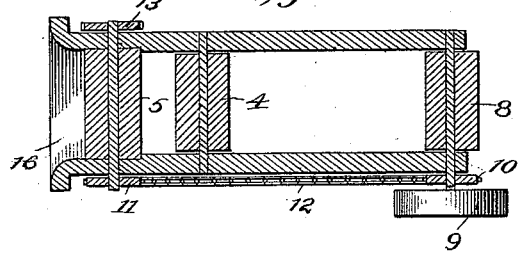
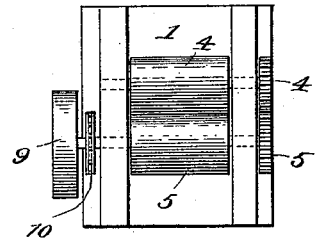
WITNESSES
Chas. F. Miller
R. Elle. Elliott
INVENTOR
Benjamin F. Hutches Jr
by J. W. M. Sterling
Attorney
THE NORRIS PETERS CO., PHOTO-LITHO., WASHINGTON, D. C.

(No Model.) 2 Sheets—Sheet 2.
B. F. HUTCHES, Jr.
BALING MACHINE.
No. 533,065. Patented Jan. 29, 1895.
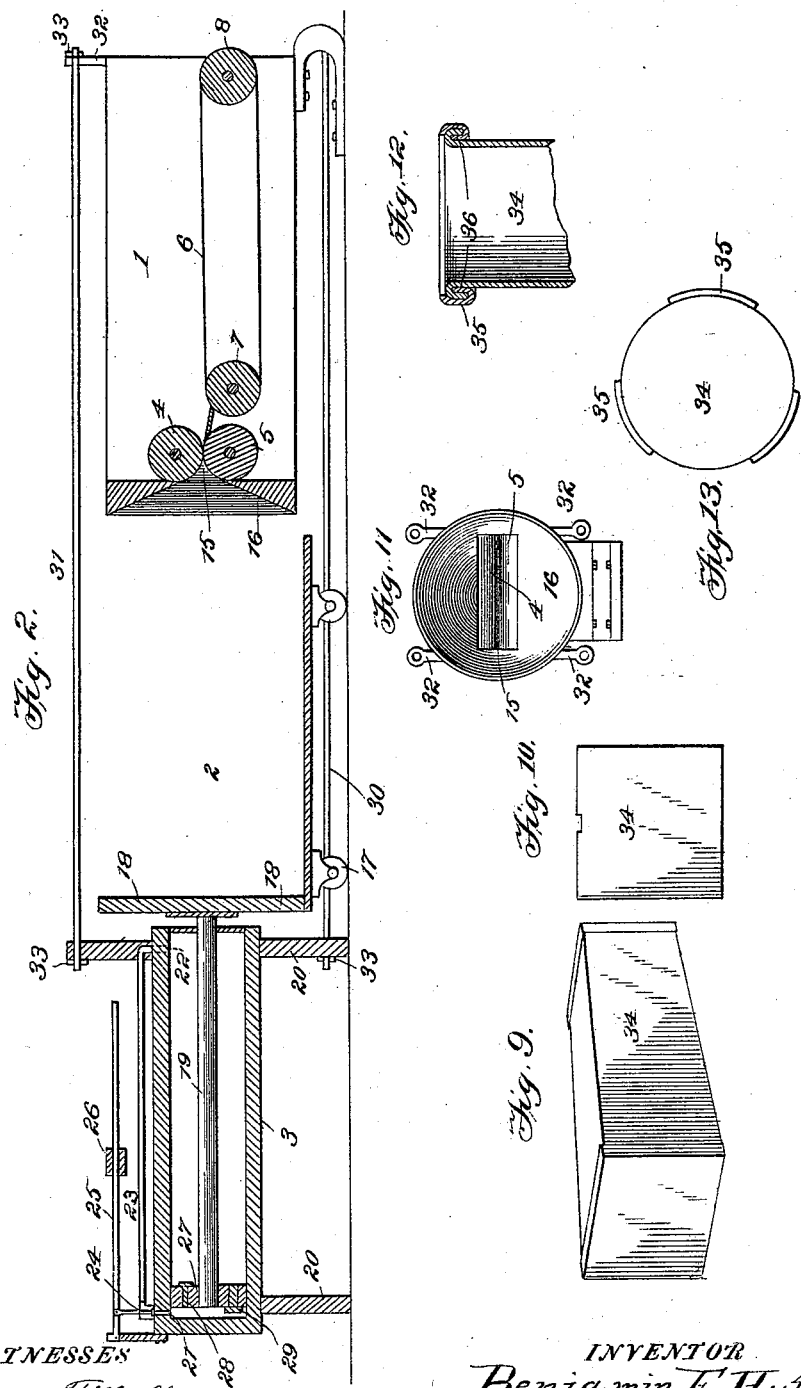

UNITED STATES PATENT OFFICE.

BENJAMIN F. HUTCHES, JR., OF GALVESTON, TEXAS.

BALING-MACHINE.

SPECIFICATION forming part of Letters Patent No. 533,065, dated January 29, 1895.

Application filed February 13, 1894. Serial No. 500,100. (No model.)

*To all whom it may concern:*

Be it known that I, BENJAMIN F. HUTCHES, Jr., a citizen of the United States, and a resident of Galveston, in the county of Galveston and State of Texas, have invented a certain new and useful Improvement in Baling-Machines, of which the following is a description.

The herein described invention relates particularly to cotton baling devices, and the object thereof has been to provide a machine by which the many manipulations heretofore necessary in completing the bale or package may be obviated.

Directly it has been the aim of the invention to have the cotton bale provided with a fire-proof covering in the form of a box or casing of sheet metal, and to have the same so applied to the bale in the process of compressing the cotton in forming the bale, that the said covering will of itself form the entire means for holding the bale intact and in its tightly compressed condition, while serving its additional function as a shipping case which will protect the bale of cotton from fire, and from all possible damage incidental to transportation and storage.

Heretofore such a complete covering of the bale as practiced in this invention has been considered of too difficult application, owing to the handling of the bale in its completed state, and impracticable because of the necessity of providing a box larger than the bale to make its application at all possible, and then the function of a bale tie for holding the bale tightly compressed would not be subserved by it, while other means must of necessity be employed to serve the function of a bale tie. The operation herein practiced by which this covering is made of practical application consists in feeding the cotton between pressure rolls to the shipping receptacle or box, holding the said receptacle in such relation to the feeding pressure rolls as to bring the said rolls within the same and causing the said receptacle to be held against the forced feed of the rolls to compact the cotton therein, and to retreat therefrom as required by the gradual filling of the same.

The invention consists of a forced feed mechanism adapted to extend into the receptacle for the cotton, and a carriage for holding the said receptacle, adapted to move to and from the feeding mechanism, and means for holding the carriage against the impact of the forced feed and to permit the same to retreat as is necessary in the process of filling.

The invention further consists in certain other novel features in the construction and arrangement of parts all as hereinafter fully described.

In the accompanying drawings, illustrating the invention, Figure 1, is a view in side elevation of the entire baling machine; Fig. 2, a longitudinal vertical sectional view taken through the center of Fig. 1, but showing the carriage entirely withdrawn from under the feeding mechanism; Fig. 3, an enlarged side view of the feed mechanism; Fig. 4, a section showing the reverse side of the feed mechanism, and the cog gear of the pressure rolls; Fig. 5, a longitudinal vertical sectional view of the feed mechanism; Fig. 6, a longitudinal horizontal sectional view of the feed mechanism taken on the line 6—6 of Fig. 5; Fig. 7, an end view of the feed mechanism showing the discharge opening thereof; Fig. 8, a rear end view of the feed mechanism; Fig. 9, a perspective view of the box in which the cotton is packed and shipped; Fig. 10, an end view of the shipping box; Fig. 11, a front end view of a modified form of the feed mechanism; Fig. 12, a modification in the form of a cylindrical box or casing adapted for use when the feeding mechanism has the form shown in Fig. 11. Fig. 13, is an end view of the cylindrical casing shown in Fig. 12.

The machine consists primarily of three important parts, as above stated: the loading or feed mechanism indicated by the numeral 1, the carriage 2 on which the shipping receptacle is supported and the compression cylinder 3 for holding the carriage against the impact of the forced feed of the feeding mechanism, and to permit the said carriage to retreat as is necessary.

The feed mechanism 1 comprises a suitable frame or box having pressure rolls 4 and 5 located therein at the discharge end, and an endless belt 6 arranged within and lengthwise of the said frame or box upon rolls 7 and 8, by means of which belt the cotton is conveyed to the pressure rolls 4 and 5 from the gin-house as well as being fed thereby to the rolls.

On the shaft forming the axle for the roll 8 is provided, on the exterior of the frame, a pulley wheel 9 which is driven from any suitable source of power and imparts motion to the conveyer belt and feed rolls through the gearing shown, which consists of a sprocket wheel 10 mounted on the shaft of the said roll 8, which imparts motion to the shaft of roll 5 upon which is mounted a sprocket wheel 11, through the sprocket chain 12.

The shafts of the pressure rolls 4 and 5 are provided on their ends, on the side opposite to that having the sprocket gearing, with cog gears 13 and 14, respectively, which bring about a positive movement of the rolls in a reverse direction to each other, which is necessary to carry the cotton between them and to forcibly expel the same therefrom into the shipping box or receptacle, which is held in such relation thereto as to bring about a constant impact between the said receptacle and the force feed of the cotton.

The discharge end of the feed mechanism is closed with the exception of a central opening 15 sufficient to disclose a portion of each of the feed rolls throughout their entire length, and provide an easy exit to the cotton. The discharge end is also dished out or provided with sides having an incline toward the said opening producing thereby an outwardly flared end portion 16 to permit a proper distribution of the cotton to all parts of the shipping receptacle, as by such a discharge opening the cotton is forced to the sides of the box, and lastly to the center insuring thereby a uniform packing as will be more fully hereinafter set forth.

The frame or casing of the feed mechanism may be of any desired form, but is preferably rectangular or cylindrical, the end portion being of necessity of the form of the cross section of the box or receptacle, as will be obvious, and as it is the function of the said feed mechanism to extend within the said receptacle it must be of a size sufficient to admit of this.

The frame of the feed portion of the machine is supported at the entrance end, as shown, in order that the shipping receptacle, which is open ended, may be allowed to incase the same, or as much thereof as is necesary, and to be free to be moved off therefrom by stages in the process of filling.

The shipping receptacle, of which two forms have been illustrated, is supported on the carriage 2, which is adapted to slide back and forth and to extend under the feed mechanism 1. This carriage 2 preferably consists of a platform supported on wheels 17 forming thereof a truck having no sides, but the same is provided at one end with a back 18, serving as a means for holding the shipping receptacle against displacement, and also the means for connecting the resistance plunger or piston rod 19 with the carriage. The cylinder 3, in which the said piston rod 19 operates, is of a length not less than that of the shipping receptacle, but preferably of slightly greater length. The cylinder is mounted upon suitable supports 20 and in direct line with the feed mechanism, and is provided with ports 21 and 22 at each end connected by a pipe 23. Port 21 is provided with a valve 24 operated by a lever 25 as shown, or other device, whereby the pressure of the air or water contained therein is relieved by the passage thereof through said port 21 and the piston rod 19 allowed to retreat.

In the present instance the lever 25 is shown with a weight 26 which allows the pressure to be relieved automatically at a predetermined degree of pressure.

The air or water forming the resisting medium to the piston 27 is forced from behind the said piston through the pipe 23 to the front of the cylinder, while a part of said medium is forced through a relief valve 28 in the said piston. A valve 29 is also provided in the piston 27 to permit of the movement of the piston forward.

To maintain the proper and fixed relation of the two portions of the machine to each other—the feed apparatus and the carriage with its operating mechanism—stay rods 30 and 31 are employed to connect with the said feed mechanism at one end by means of the supports 32 and with the supports of the compression cylinder at the other end. The tension of the rods may be regulated as desired by the nuts 33.

The shipping receptacle which forms an element of the machine in its operation, is an open ended box or casing preferably of sheet metal, and may be either rectangular or cylindrical and must conform to the shape of the feed mechanism frame. In Figs. 9 and 10, is shown a perspective and an end view of the rectangular receptacle, respectively. The ends of the receptacle are closed by means of covers one of which is put on before, and the other after the receptacle is packed.

In Figs. 12 and 13, is shown the cylindrical form of box or receptacle which is used when the form of the feed mechanism is that shown in Fig. 11. In this form of receptacle the cover has hook portions 35 located on its periphery which engage the overturned portions 36 on the ends of the box. The cover in this modification is first applied with the hook flanges 35 out of line with the overturn portions 36, and engagement is effected by simply turning the cover.

The complete operation of the machine is as follows: While the carriage is in the position shown in Fig. 2, the shipping receptacle or box is placed thereon and the carriage advanced so as to extend under the feed mechanism, while bringing the said feed mechanism within the shipping box. In this position the back of the carriage, or the rear end of the box, is brought in contact with the discharge end of the feed mechanism and is held against the impact of the cotton as it is forced from between the pressure or feed rolls. The margin of space to be filled by the cotton on starting the machine is simply that of the flared opening in the discharge end of the feed mechanism, and as this becomes filled and the proper degree of compactness obtained by the impact, the pressure exerted thereby will be sufficient to cause the pressure cylinder to relieve itself automatically and permit the carriage and the receptacle to retreat sufficiently to make room for the crowding of more cotton therein under a uniform pressure, and to make the process continuous until the receptacle is packed. The cotton is subjected to a double pressure, first by passing under the pressure and feed rolls, and then from the impact of the forced feed. The proper distribution and packing of the cotton within the receptacle depends largely upon the form of the discharge end of the feed mechanism. Being flared outward from the discharge opening the sides thereof have a tendency to direct the cotton to the sides of the receptacle, and cause it to become thoroughly packed owing to the tendency of the cotton to crowd away from the center and fill up the more contracted spaces between the discharge end at its sides and the body of the cotton already impacted. After the box or casing is filled the open end thereof is then closed, and the completed package taken from the carriage ready for shipment.

By the invention herein described I am enabled to produce a very closely compacted bale, saving thereby space in transportation and storage, while the bale is not only completed without handling thereof or the application of bale ties thereto, but is entirely incased in a sheet metal casing affording thereby absolute protection from fire, or other damaging influence.

Having thus fully described my invention, what I claim as new, and desire to secure by Letters Patent, is—

1. In a baling machine, the combination with a feed mechanism consisting of pressure rolls mounted within an inclosing frame and supported at one end thereof, of a carriage adapted to extend under the feed mechanism frame to bring its rear end against the feed end of the feed mechanism and offer a resistance to the forced feed, and means for holding said carriage against the impact of the feed and permit the same to retreat in the process of filling, as set forth.

2. In a baling machine, the combination with a feed mechanism consisting of a frame or inclosure, having mounted therein at its feed end pressure rolls, the said frame being adapted to be incased by the shipping receptacle, whereby, as the cotton comes from the rolls it will be impacted against the end of said receptacle, of a carriage adapted to support said receptacle and hold the same against the impact of the forced feed, and means for offering a resistance to said carriage, as set forth.

3. In a baling machine, the combination with a feeding mechanism consisting of a frame or inclosure supported at one end, having a conveyer provided therein, and pressure rolls arranged within the frame at the feed end thereof, of a carriage to support the packing receptacle adapted to extend under said feed mechanism, whereby to bring said feed mechanism wholly within the packing receptacle and the pressure rolls in close proximity to the end thereof, and means connected with said carriage to offer a resistance to the impact of the forced feed, as and for the purpose set forth.

4. In a baling machine, the combination with a feed mechanism consisting of a frame or inclosure adapted to be enveloped by the packing receptacle, having a discharge opening, pressure rolls arranged adjacent thereto, and having its discharge end portion outwardly flared from the discharge opening, of a carriage adapted to be moved to and from said feed mechanism and to extend under the same and for holding the packing receptacle against the impact of the feed, whereby the feed mechanism is brought within said receptacle, and means for regulating the resistance of the carriage.

5. In a cotton baling machine, the combination with a feeding mechanism consisting of a frame or inclosure adapted to extend into the packing receptacle, and be enveloped thereby, having an outwardly flared discharge end, rolls arranged at the opening in said end, and a conveyer belt arranged within the interior of the feed mechanism, of a carriage adapted to support said packing receptacle a pressure cylinder having a piston working therein and having the piston rod thereof held in contact with the carriage, as and for the purpose set forth.

In testimony whereof I hereunto affix my signature in the presence of two witnesses.

BENJAMIN F. HUTCHES, JR.

Witnesses:
CHAS. G. CLIFFORD,
CLIFFORD VAN SICKLE.